United States Patent [19]
Ponzio et al.

[11] Patent Number: 5,984,085
[45] Date of Patent: Nov. 16, 1999

[54] APPARATUS AND METHOD FOR THE ADJUSTMENT OF WORKPIECE CARRIERS IN AUTOMATIC PRODUCTION LINES

[75] Inventors: Massimo Ponzio, Barberino V. Elsa; Fabrizio Cresti, Tavernelle V. Pesa, both of Italy

[73] Assignee: Atop S.p.A., Barberino Val D'Elsa-Fi, Italy

[21] Appl. No.: 08/798,761

[22] Filed: Feb. 11, 1997

[30] Foreign Application Priority Data

Jul. 26, 1996 [IT] Italy ..................................... PI6A0037

[51] Int. Cl.⁶ .................................................. B65G 15/64
[52] U.S. Cl. .................................. 198/867.08; 198/345.3; 198/803.3
[58] Field of Search ........................... 198/345.3, 803.04, 198/803.03, 867.08; 29/33 P

[56] References Cited

U.S. PATENT DOCUMENTS

| | | | |
|---|---|---|---|
| 4,591,991 | 5/1986 | Sticht | 29/33 P X |
| 5,115,901 | 5/1992 | Santandrea et al. | 198/345.3 |
| 5,255,778 | 10/1993 | Santandrea et al. | 198/345.3 X |
| 5,346,058 | 9/1994 | Santandrea et al. | 198/867.08 |
| 5,348,142 | 9/1994 | Nishimura et al. | 198/867.08 |
| 5,474,166 | 12/1995 | Santandrea et al. | 198/345.3 |
| 5,685,413 | 11/1997 | McGough | 29/33 P X |

FOREIGN PATENT DOCUMENTS

| | | |
|---|---|---|
| 0 348 715 | 1/1990 | European Pat. Off. . |
| 0 447 805 | 9/1991 | European Pat. Off. . |
| 5107/89 | 1/1989 | Italy . |

*Primary Examiner*—Christopher P. Ellis
*Assistant Examiner*—Steven B. McAllister
*Attorney, Agent, or Firm*—Browdy and Neimark

[57] ABSTRACT

An apparatus and a method for the automatic adjustment of the distance between the holding members (2) of a pallet (3) connected to a fastening bar (12) and which allow a movement in a transverse plane with respect to the fastening bar between a first auto-locking position on the fastening bar and a second position of free movement. An apparatus for gripping (11) the holding members (12), an apparatus for moving (10) the gripping apparatus (11) from the first to the second position and an apparatus for translating (17) the apparatus for moving (10) parallelly to the fastening bar (12) are provided for. The adjustment method comprises the steps of: controlling the actual location of said arms with respect to said fastening bar in comparison with a stored location and change of the location of said arms only when said locations are different from each other. The apparatus and the method allow for a precise location of the holding members without the need of a displacement to a position of zero and without the need of moving them when they are already at a location to receive the workpiece correctly.

16 Claims, 6 Drawing Sheets

APPARATUS AND METHOD FOR THE ADJUSTMENT OF WORKPIECE CARRIERS IN AUTOMATIC PRODUCTION LINES

FIELD OF THE INVENTION

The present invention relates to an adjustment apparatus of workpiece carriers of the type having variable distance holding members for workpieces of different dimensions in automatic production lines.

The invention relates also to a corresponding adjustment method.

DESCRIPTION OF THE PRIOR ART

Automatic production lines are known wherein the workpieces are put on workpiece carriers, also called pallets and so named hereinafter, which hold and move them through many workstations.

A particularly effective pallet suitable for this use is described in U.S. Pat. No. 5,799,912, in the name of the same applicant.

As already described in the introduction of said patent application, each pallet, downstream from a starting station where it receives a workpiece, moves on a conveyor which carries it selectively through the workstations. In each workstation, if necessary, the workpiece is offered to a machine which picks it up away from the pallet, works on it and then leaves it again on the pallet which continues moving.

Workpieces have not all the same size and for this reason the machines provided for in the workstations can be quickly modified to fit with different workpieces. Also the pallets, for this reason, shall be adjusted in real time to receive properly each workpiece.

For example, when the workpieces are armatures of electric motors, comprising longitudinal grooves in which a wire must be wound, winding machines are known which are capable of working with pieces in a large range of dimensions, different both in their diameter and in their length. The pallets, in this case, shall offer the armatures to the machine centred and held by variable distance supports adjusted as a function of their length.

Besides manually adjustable pallets, not exactly suitable for automatic and flexible production lines, other pallets are known having holding supports automatically adjustable at adjustment stations. For example, in EP 348715 a pallet for armatures is described having two V shaped supports which hold the ends of an armature shaft. The V shaped supports are slidingly mounted on a guide integral to the pallet, on board of which means for the translation of the supports on the guide are provided for, such as an endless screw automatically operable in an adjustment station. Locking devices are provided for on the pallet, preventing the support from translating on the guide until, in the adjustment station, actuating means act on the locking means freeing the supports and allowing that motorised means can act on the means for the translation, thus causing the supports to slide on the guide up to a new position. All the embodiments described comprise an adjustment apparatus having heads engaging with the means for the translation on board of the pallet and with the locking means, also mounted on the pallet. Therefore, besides the adjustment station, mechanically complex pallets must be provided for, as well as means for actuating the locking means.

In IT 5107/A/89 an adjustment apparatus of variable distance support members is described. The supports comprise a V shaped plate engaging with a couple of parallel guides on which the supports can slide moving towards and away from each other when not blocked by locking means. The adjustment apparatus has two horizontally and vertically translating heads capable of unlocking the support members and of moving them to a new location.

In EP447805 a pallet is described having simpler structure and consisting substantially in a frame defining a central aperture. On the frame a T-shaped guide is mounted with which support members slidingly engage having V-shaped ends for a workpiece. Locking devices are provided for, which resiliently engage with the supports frictionally pushing them against the T guides. The supports can be automatically unlocked in order to slide on the guide. The adjustment apparatus comprises an actuating unit provided below the pallet and acting on the locking devices to keep them away from the guide, whereas a first couple of translating heads is provided for above the pallet pushing the holding supports along the guide up to a central reference position. Then, a second couple of translating heads pushes them along the guide up to the new location, at which the actuating unit frees the locking devices preventing the supports from further translating before the next adjustment. The adjustment steps are quite complex and must be made for each pallet, even for those pallets whose holding supports are already in correct position, and do not need any adjustments. Such a useless repetition of the adjustment cycle prevents from reducing the length of time necessary for the whole adjustment step.

The automatically adjustable pallets according to the known art, above described, require necessarily the presence of unlocking devices of the locking means. Therefore, they need adjustment means of the position of the supports which are also able to free the supports from the locking means before translating them. This requires a complex structure both of the pallet and of the automatic adjustment means. Moreover, the existing pallets do not allow the automatic replacement of the support members, because they are slidingly mounted on the guides but cannot easily be moved away from them, unless manually.

In the pallet described in U.S. Pat. No. 5,799,912 in the name of the same applicant, instead, the holding supports are auto-locking on the guide and means for their automatic locking/unlocking with respect to the guides are not necessary. Moreover, in the preferred embodiment there described, the displacement of the supports may also be carried out manually, after a rotation with respect to the fastening bar substantially without touching it before the next auto-locking at the new location. This characteristic allows for both a manual and automatic adjustment. In addition, the fact that the holding supports are physically separable from the fastening bar allows the fact that they can be automatically replaced with other supports members of different shape.

SUMMARY OF THE INVENTION

It is an object of the present invention to provide an apparatus for the automatic adjustment of the distance between the holding members of such a pallet.

It is another object of the present invention to provide an apparatus for the automatic adjustment of the distance between the holding members of a pallet whose structure is simpler than the existing ones.

It is a further object of the present invention to provide an apparatus and a corresponding method for the automatic adjustment of the distance between the holding members of a pallet capable of carrying out a precise location of the holding members without requiring a displacement thereof to a position of zero and that at the same time do not need their displacement when they are already in a correct position for holding the workpiece.

It is a further object of the present invention to provide an apparatus and a corresponding method for the automatic adjustment of the distance between the holding members of a pallet, which is capable of allowing the quick replacement of the holding members with other members of different shape and size.

These and other objects are achieved by an apparatus according to the invention for the automatic adjustment of the distance between the holding members of a pallet, of the type comprising members supporting a workpiece connected to a fastening bar and allowing a movement in a plane transverse to said bar between a first auto-locking position on the fastening bar and a second position of free movement. The characteristic of the apparatus is that it comprises: gripping means for said holding members, means for moving said gripping means from said first to said second position, and means for translating parallelly to said fastening bar said means for moving.

Preferably, the movement of said holding members in the plane transversal to the fastening bar is a rotation with respect to the fastening bar between a first angular position and a second angular position, said means for moving said gripping means from said first to said second position, and back, allowing an angular rotation concentric to the rotation of said holding members.

An adjustment method comprises the steps of:
controlling of the actual location of the holding members with respect to the fastening bar and comparing said actual location with a stored location,
changing the location of the holding members with respect to the fastening bar starting form the actual location up to the stored location only when said actual location and said stored location differ from each other.

BRIEF DESCRIPTION OF THE DRAWINGS

Further characteristics and advantages of the apparatus and of the method according to the present invention will be made clearer in the following description of an exemplifying embodiment thereof, with reference to the attached drawings, wherein.

DESCRIPTION OF A PREFERRED EMBODIMENT

Figure 1:
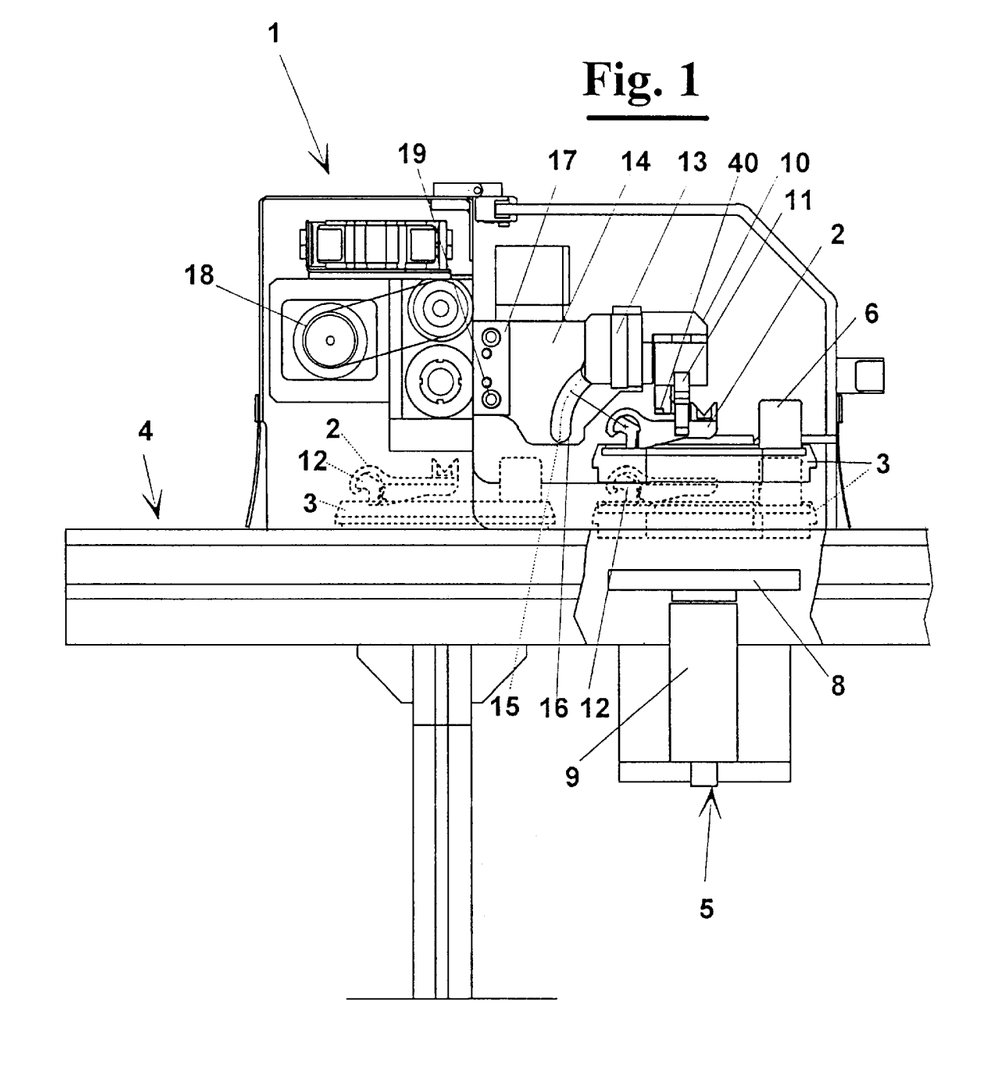
FIG. 1 shows a longitudinal elevational view of an apparatus according to the invention for the automatic adjustment of the distance between the holding members of a pallet.
Figure 2:
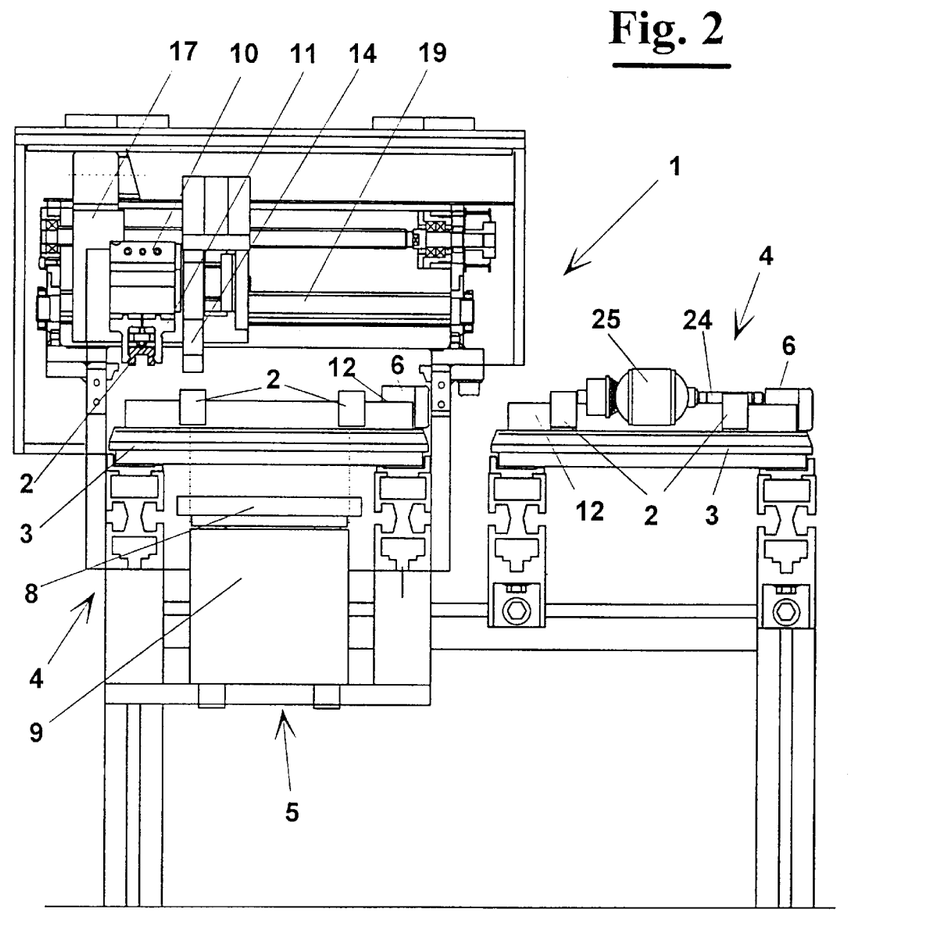
FIGS. 2 and 3 show, in a elevational partially cross sectional view and in a top plan view, respectively, the apparatus of FIG. 1.
Figure 3:
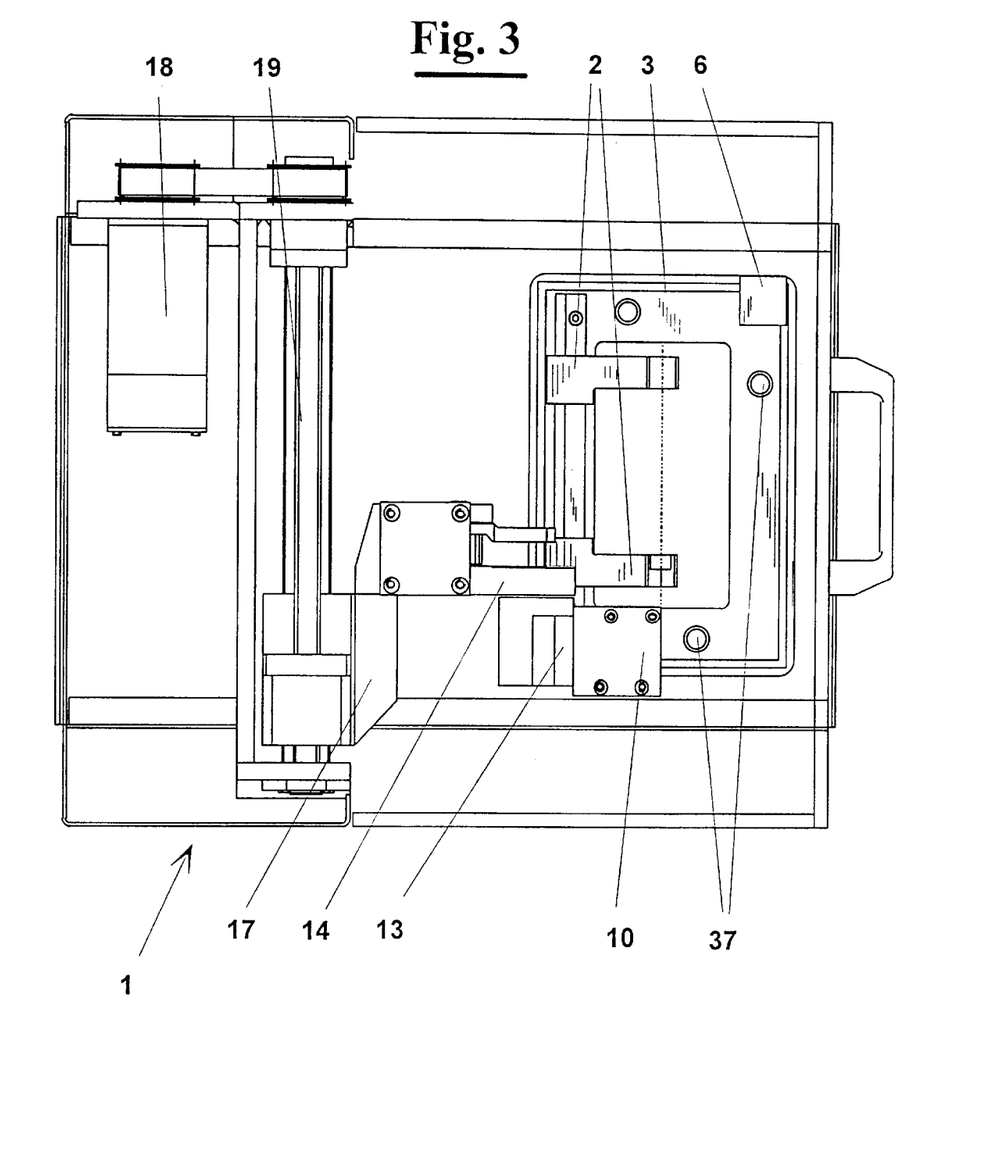

With reference to FIGS. from 1 to 3, an apparatus 1 for the adjustment of the distance between the holding members 2, or arms, of a pallet 3 is associated to an automatic conveyor transfer system of pallets 3 through many workstations, not shown.

Apparatus 1 is in particular placed at a station 5, where each pallet 3, before receiving a workpiece, is identified by means of a coded sensor 6 integral to it. At station 5, a platform 8 is raised by a cylinder 9 up to the pallet 3 which is centred by means of reference pins 7, shown in FIG. 8. Then, the platform 8 raises the pallet up to the adjustment apparatus described hereinafter.

According to the invention, apparatus 1 comprises a head 10 having a gripper 11 suited to grip one of the holding members 2, or arms, of pallet 3, which are mounted in a auto-locking way on fastening bar 12, which is integral to pallet 3 itself. Head 10 is slidingly mounted on a first slide 13 having an internal actuator moving head 10 orthogonally to arms 2 in a plane transverse to fastening bar 12. First slide 13, in turn, can move with respect to a plate 14 following a path 15 defined by a groove 16. Plate 14 is mounted on a second slide 17, which moves horizontally, operated by an engine 18 by means of a belt and an endless screw 19, or, alternatively, by equivalent linear actuating means.

Figure 7:
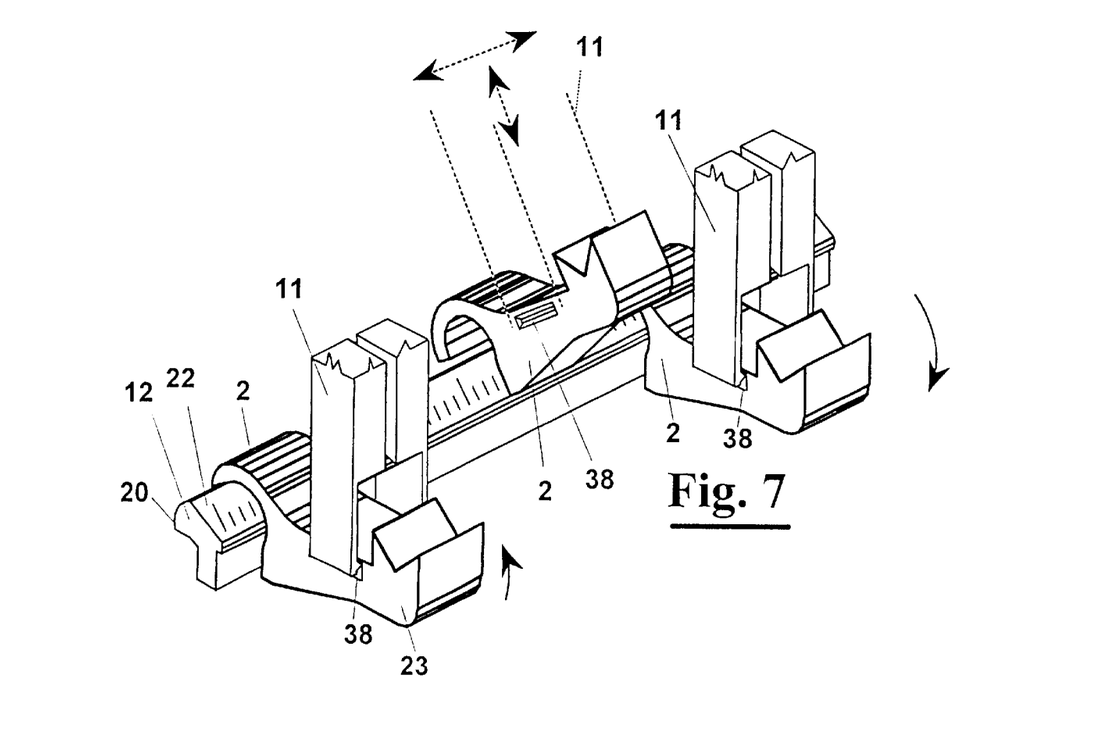
FIG. 7 shows in a single perspective view the three engagement/disengagement steps between the holding members and fastening bar of FIGS. 4, 5 and 6.

In more detail, as already described in U.S. Pat. No. 5,799,912 with different reference numbers, a preferred embodiment of pallet 3 has fastening bar 12 (FIGS. 4–7) provided with a longitudinal cylindrical portion 20 having a flattening 21 suited to receive a graduated line 22. Arms 2 of pallet 1 have a free V-shaped end 23 capable of holding a shaft 24 of a workpiece 25, for example an armature of an electric motor, visible in a portion of the conveyor parallel to that comprising the adjustment station 5 and shown in FIG. 2, on the right. At the end opposite to free end 23, arms 2 have a tubular open body 26, having an internal cylindrical housing 27 of the same diameter of cylindrical portion 20 of fastening bar 12. As seen in FIG. 7, the fastening bar includes a substantially constant cross section taken on a plane perpendicular to its length and extending over a substantial portion of its length.

Figures 4, 5, 6:
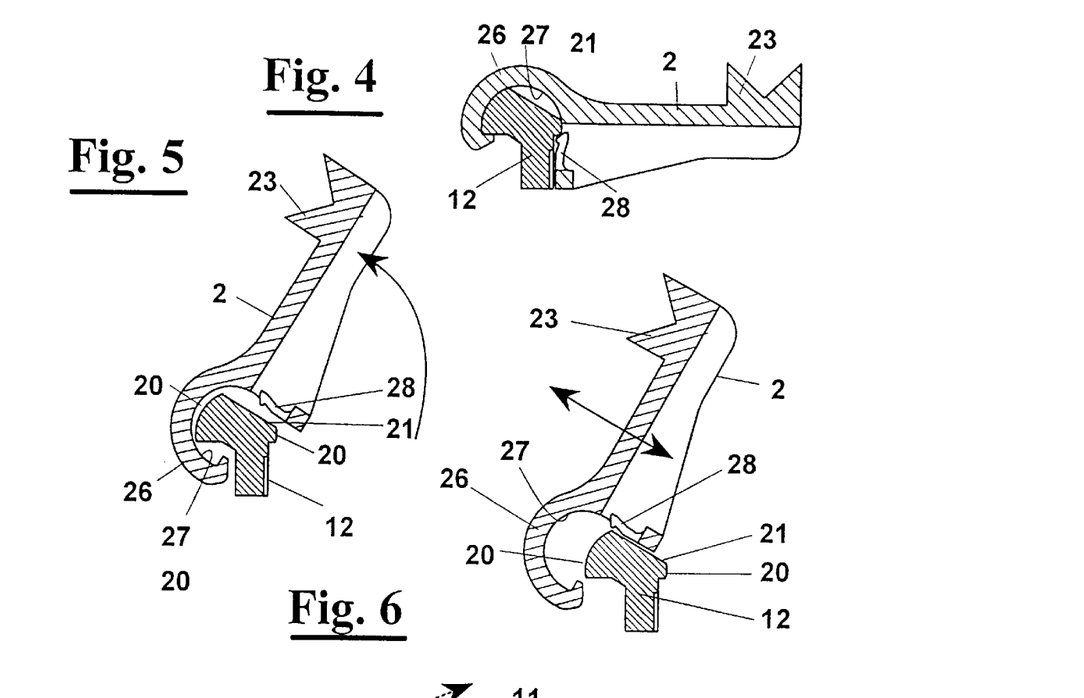
FIGS. 4, 5 and 6 show a cross sectional view of three successive steps of the engagement of the holding members with the fastening bar of a pallet on which the apparatus of FIG. 1 acts.

Always with reference to FIGS. from 4 to 7, the disengagement and then the engagement of each arm 2 with respect to fastening bar 12 occurs as follows. Starting from an auto-locked position on fastening bar 12 by means of a resilient tooth 28, holding arm 2, in order to be moved, must be rotated, as shown in FIG. 5, and must be orthogonally moved away, only slightly, from fastening bar 12, as shown in FIG. 6. In such position, arm 2 is completely released from fastening bar 12 and can be moved to another location of the bar, without even touching it, held by gripper 11.

An inverse rotation is shown in FIG. 7, where, as indicated by the arrows, each holding arm 2, starting from the locked position (shown on the left), can be moved by gripper 11 to the free movement position (in the middle) and, after having reached the preferred location, can be moved and rotated inversely (on the right) and then auto-locked again on fastening bar 12.

Figure 9:
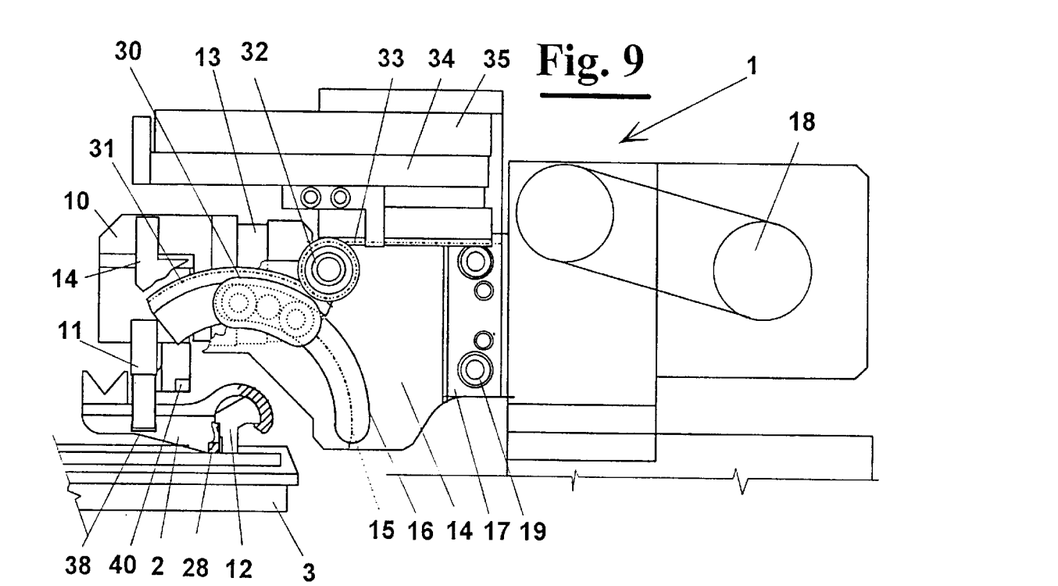
FIGS. 9 and 10 show respectively in elevational lateral partially cross sectional view the adjustment unit of the apparatus of FIG. 1 in two different operative positions.

In the case of this particular preferred coupling between fastening bar 12 and holding arms 2, in order to cause, in turn, their disengagement, the adjustment of their location and then their auto-locking, slide 13 follows a circular path 15 (FIG. 1) with respect to plate 14, said path being defined by groove 16 shaped as a circular slot, concentric to the axis of the cylindrical portion of fastening bar 12 when the pallet is on platform 8. More precisely, with reference to FIGS. 9 and 10 (showing the moving and translating mechanisms of the present invention), a carriage 30 engages with groove 16, integral to a portion of a curved rack 31, meshing with gear 32 integral to plate 14. Above the latter a linear rack 33 integral to a third slide 34 is provided for, which can move horizontally with respect to an upper support 35. When the third slide 34 is in retracted position (FIG. 9) with respect to upper support 35, head 10 is in horizontal position and gripper 11 is lowered so as to grip arm 2, which is auto-locked on fastening bar 12 of the pallet. The movement of gripper 11, orthogonally to arm 2, is caused by the sliding of head 10 on first slide 13.

Figure 10:
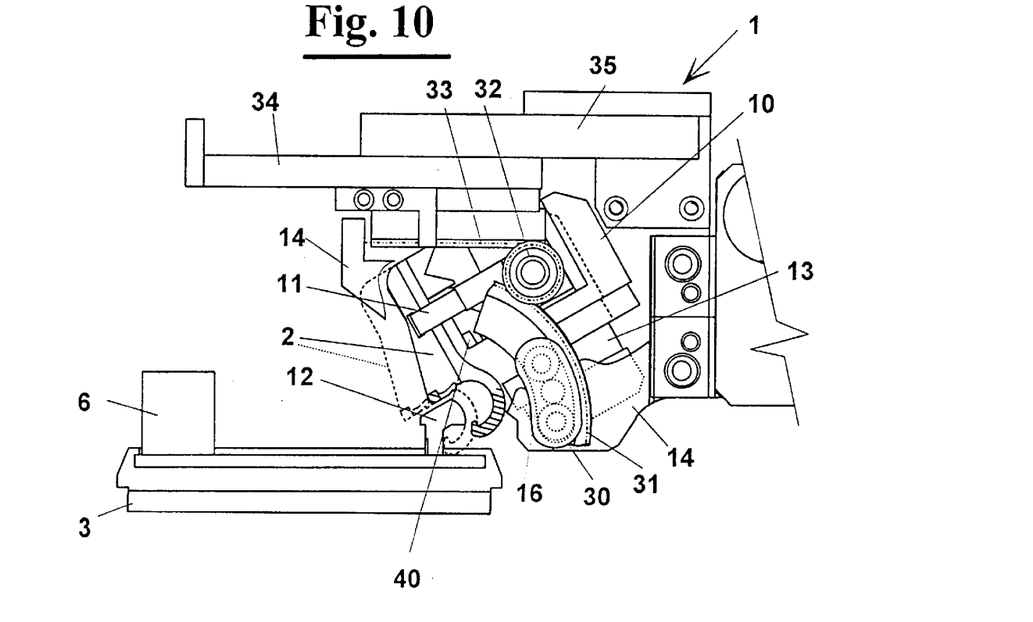

With reference to FIG. 10, the movement of third slide 34 with respect to upper support 35 causes curved rack 31, through linear rack 33 and gear 32, to slide in groove 16, in a way which is similar, likewise the movement of an operator who wants manually obtain the same effect, to a hand rotating about its wrist, so that head 10 rotates about fastening bar 12 following path 15.

In the position of maximum rotation of FIG. 10, then, head 10 slides backwards on first slide 13, moving arm 2 away from fastening bar 12 starting from the position illustrated by a dotted line. It is to be noted that a movement of arm 3, away from fastening bar 12, even shorter than as shown in FIG. 10 is sufficient to allow the disengagement of the former with respect to the latter, thus allowing the transversal motion caused by second slide 17 operated by endless screw 19.

Figure 8:
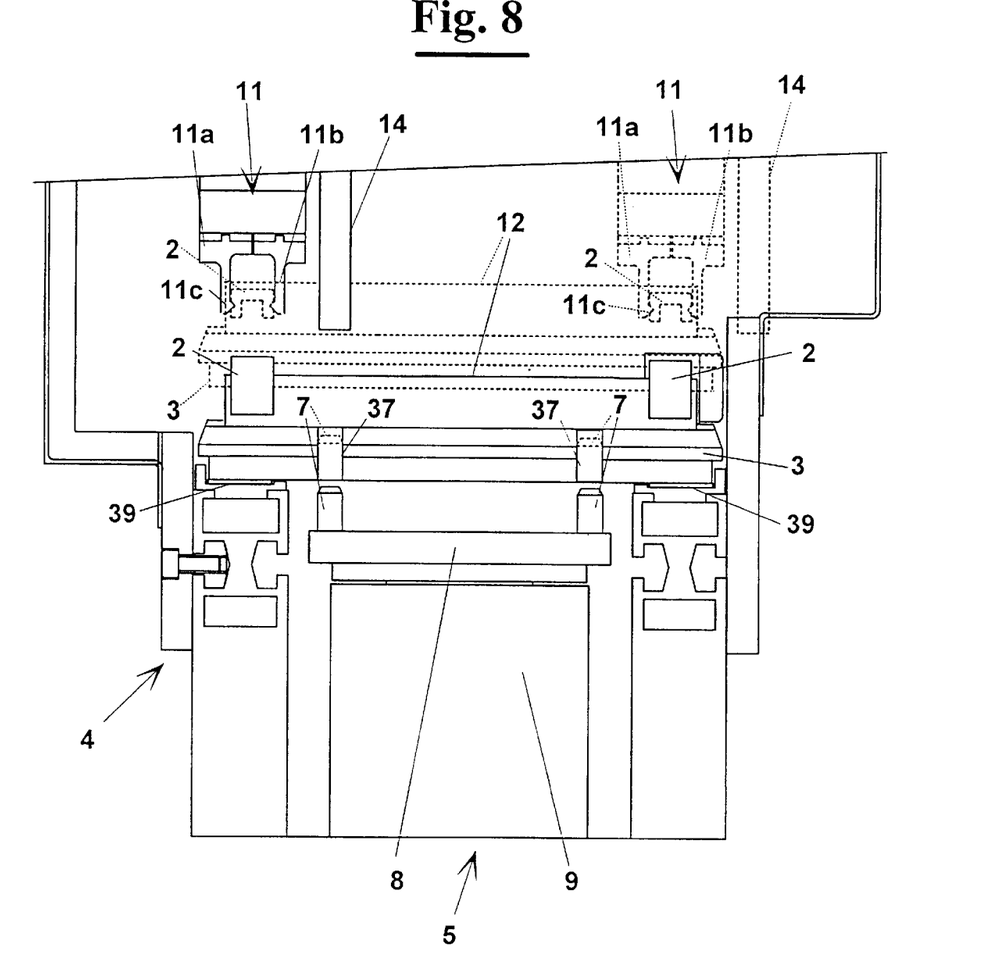
FIG. 8 shows an elevational partially cross sectional view of the apparatus of FIG. 1 in different operative positions.

The two opposite extreme locations of head 10 with respect to fastening bar 12 are shown in FIG. 8, where the pallet is illustrated both in lowered position on a conveyor belt 39, and in raised position, indicated with a dotted line. Obviously, gripper 11 can move each arm 2 to whichever intermediate location, between the left (continuous line) and the right (dotted line) of FIG. 8, according to the size of the workpiece held by the pallet.

Also in FIG. 2 holes 37 of the pallet are shown, in which reference pins 7 of platform 8 engage. Moreover the two-portions 11a e 11b of gripper 11 are shown, which can approach each other while engaging their teeth 11c with recesses 38 laterally provided for on holding members and shown in FIG. 7.

All the above described movements can be made quickly in turn, operated by a computerised unit, which indicates a stored location of holding members 2 with respect to fastening bar 12, then compared to the actual location of the holding members when the pallet stops at the adjustment station. More precisely, the adjustment method comprises a step in which the second slide 17 stops gripper 11 exactly at one of holding members 2, by means of an optical sensor 40, shown in FIGS. 1, 9 and 10 and not described further because it is of commercially available known type. Sensor 40 detects the location of holding members 2 with respect to fastening bar 12 and communicates this to a control unit not shown. The latter compares the stored location with the actual location and operates motor 18, for example a step motor or equivalent linear actuator, causing the translation of second slide 17 up to said stored location, only if the stored location differs from the actual location.

From this, two advantages rise with respect to the known art, and in particular with respect to EP 447805. In fact, the direct comparison between the actual location and the stored location does not require, every time, the translation to a position of zero, with a first saving of time on the adjustment cycle. In addition, the presence of a sensor and the direct comparison allows for the fact that the translation of the holding members is not necessary when they are already in a location coinciding to the stored location, with a further saving of time on the cycle, because many pallets pass the adjustment station without that their holding members are touched.

With respect to the known art further improvements are present:
means for locking/unlocking the holding members are not necessary, since they are auto-locking on the fastening bar;
means for engaging with the locking/unlocking means are not provided for;
means are not provided for on board of the pallet for moving the holding members;
the automatic replacement of the holding members with other holding members of different shape is possible; for this last possibility it is sufficient that head 10, by means of second slide 17, is translated up to a position of exchange of the holding members, not shown, where a holding member can be left and a new holding member having different shape can be picked up;
both the adjustment apparatus and the pallet can be more easily manufactured and used with respect to the known art.

Finally, notwithstanding reference has been made to a rotation movement of head 10 with respect to fastening bar 12, it is possible that a movement following a different path is necessary, depending on the auto-locking movement of holding members with respect to fastening bar 12.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

We claim:

1. In combination: an adjustable workpiece carrier or pallet for automatic production lines and an apparatus for adjusting the pallet;
   (a) the pallet comprising
   a fastening bar having a length and defining a continuous plurality of fastening locations thereon; and
   holding members movable between a first position of free movement and an auto-locked second position wherein said holding members are automatically locked onto said fastening bar, the holding members being movable between the first position and the second position via a transverse movement transverse to the length of said fastening bar, and the holding members being movable at any one of the fastening locations; whereby an adjustable distance between the holding members is provided;
   (b) the apparatus comprising:
   at least one holding-member gripper;
   a moving mechanism, movable in a plane transverse to the length said fastening bar, moving the gripper between the first position of free movement the auto-locked second position; and
   a translating mechanism translating the moving mechanism and the gripper to a new one of the chosen locations, the translating mechanism movable with respect to said fastening bar when said holding members are in said first position of free movement.

2. The combination according to claim 1, wherein the transverse movement of said gripper includes a rotation with respect to said fastening bar and the first position and the second position are angular positions, and wherein the rotation is concentric with the length of said fastening bar.

3. The combination according to claim 1, wherein said moving mechanism comprises a
   head including said gripper and
   a slide onto which said head is fastened, said slide being connected to said translating mechanism and defining a second path for said head portion in a plane transverse to the length of said fastening bar.

4. The combination according to claim 1, wherein said moving mechanism comprises:
   a head holding said gripper;
   a support comprising a groove defining a first path and an actuator forcing said head to move in said groove following said first path,
   a slide on which said support is movable, said slide being connected in turn to said translating mechanism and defining a second path for said support in a plane transverse to the length of said fastening bar, whereby said head is connected to said translating mechanism through said support and said slide, and said head is movable with respect to said translating mechanism according to said first and second paths.

5. The combination according to claim 1, wherein said moving mechanism comprises:
   a head holding said gripper,
   a support comprising a groove defining a first path in a plane transverse to the length of said fastening bar, said support being connected to said translating mechanism,
   a slide on which said head is movable and defining a second path for said head, and
   an actuator forcing said slide to move in said groove following said first path, whereby said head is connected to said translating mechanism through said slide and said support,
   said head being movable with respect to said translating mechanism according to said first and second paths.

6. The combination according to claim 1, wherein said moving mechanism comprises:
   a head holding said gripper;
   a slide holding said head;
   a curved rack integral with said slide;
   a support, said support being integral to said translating mechanism and including a groove circular and concentric to a rotation of said holding members;
   a slider for sliding said curved rack in said groove;
   a linear rack translating with respect to said support; and
   at least one gear transmitting a motion of said linear rack to said curved rack.

7. The combination according to claim 1 comprising:
   optical sensor means for detecting a gripper position of said gripper with respect to said holding members on said fastening bar;
   control means responsive to said optical sensor means for stopping said gripper at said holding members; and
   comparison means for comparing an actual location of said holding members with respect to said fastening bar with a stored location, said gripper acting on said holding members only when said actual location differs from said stored location.

8. The combination according to claim 1, wherein said gripper includes sharp edges and said holding members comprise means for engaging with the sharp edges of said gripper, said means for engaging comprising recesses disposed laterally on said holding members and conforming to said sharp edges.

9. The combination according to claim 1, wherein the fastening bar includes a substantially constant cross section taken on a plane perpendicular to a length thereof, the substantially constant cross section extending over a substantial portion of a length thereof.

10. The combination according to claim 1, wherein said moving mechanism comprises a head including said gripper, the head being connected to said translating mechanism via a support, said support comprising a groove defining a first path, said moving mechanism further comprising an actuator forcing said head to move in said groove following said first path.

11. The combination according to claim 10,
   wherein the transverse movement of said gripper includes a rotation with respect to the length of said fastening bar of said holding members, and
   wherein said groove which defines said first path is circular and concentric to the rotation of said holding members.

12. A method for adjusting a distance between holding members of a workpiece carrier or pallet for automatic production lines; the pallet including a fastening bar and holding members movable with respect to the fastening bar between an auto-locked second position and a first position of free movement along the fastening bar; at least one of the holding members being continuously movable while in the first position of free movement to a chosen new location along the fastening bar and then auto-lockable with respect to the fastening bar:
   said method comprising steps of:
   gripping said holding members;
   moving said gripped holding members from said auto-locked position to said position of free movement along said fastening bar;
   translating said gripped holding members when said holding members are in said position of free movement up to said new location;
   at said new location, moving said gripped holding members from said position of free movement to said auto-locked position; and
   leaving said holding members auto-locked on said fastening bar.

13. The method according to claim 12, wherein said movement with respect to said fastening bar between the auto-locked second position and the first position of free movement is a rotation with respect to a length of said fastening bar, and wherein said step of moving further comprises a rotation of said holding members about said fastening bar from said auto-locked position to said position of free movement and back.

14. A method for adjusting a distance between holding members of a workpiece carrier or pallet for automatic production lines; the pallet including a fastening bar and holding members movable with respect to the fastening bar between an auto-locked second position and a first position of free movement along the fastening bar; at least one of the holding members being continuously movable while in the first position of free movement to a chosen new location along the fastening bar and then auto-lockable with respect to the fastening bar:

said method comprising steps of:

controlling an actual location of said holding members with respect to said fastening bar by comparison with a stored location; and changing the location of said holding members with respect to said fastening bar starting from said actual location up to said stored location only when said locations are different from each other;

said step of changing further comprising steps of:

gripping said holding members;

moving said gripped holding members from said auto-locked second position to said first position of free movement on said fastening bar;

translating said gripped holding members when said holding members are in said position of free movement up to said new chosen location;

moving said gripped holding members at said new chosen location from said position of free movement to said auto-locked position; and leaving said holding members auto-locked on said fastening bar.

15. The method according to claim 14, wherein said movement with respect to said fastening bar between the auto-locked second position and the first position of free movement is a rotation with respect to a length of said fastening bar, and wherein said step of moving further comprises a rotation of said holding members about said fastening bar from said auto-locked position to said position of free movement and back.

16. A method for adjusting a distance between holding members of a workpiece carrier or pallet for automatic production lines; the pallet including a fastening bar and holding members movable with respect to the fastening bar between an auto-locked second position and a first position of free movement along the fastening bar; at least one of the holding members being continuously movable while in the first position of free movement to a chosen new location along the fastening bar and then auto-lockable with respect to the fastening bar:

said method comprising steps of:

optically controlling an actual location of said holding members with respect to said fastening bar in comparison with a stored location; and changing the location of said holding members with respect to said fastening bar starting from said actual location up to said stored location only when said locations are different from each other.

* * * * *